(12) United States Patent
Hall et al.

(10) Patent No.: US 7,797,063 B2
(45) Date of Patent: Sep. 14, 2010

(54) METHOD FOR MODEL GAIN MATRIX MODIFICATION

(75) Inventors: Roger S. Hall, Billings, MT (US); Adi R. Punuru, Oak Hill, VA (US); Tod J. Peterson, Herndon, VA (US); Trevor S. Pottorf, Coppell, TX (US); Lewis E. Vowell, Billings, MT (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/891,920

(22) Filed: Aug. 14, 2007

(65) Prior Publication Data

US 2008/0052050 A1    Feb. 28, 2008

Related U.S. Application Data

(60) Provisional application No. 60/839,688, filed on Aug. 24, 2006.

(51) Int. Cl.
*G05B 13/12* (2006.01)
*G06F 1/02* (2006.01)

(52) U.S. Cl. .............................. 700/44; 700/28; 700/30; 700/31; 700/38; 708/277

(58) Field of Classification Search .................. 700/28, 700/30, 31, 38, 44; 708/277
See application file for complete search history.

(56) References Cited

U.S. PATENT DOCUMENTS

| | | | |
|---|---|---|---|
| 4,349,869 A * | 9/1982 | Prett et al. ..................... 700/39 |
| 6,587,108 B1 * | 7/2003 | Guerlain et al. .............. 345/440 |
| 6,654,649 B2 * | 11/2003 | Treiber et al. .................. 700/31 |
| 7,231,264 B2 | 6/2007 | Zheng et al. |
| 2002/0016640 A1 * | 2/2002 | Gagne .......................... 700/29 |
| 2006/0074501 A1 * | 4/2006 | Hartman et al. ............... 700/29 |
| 2006/0287741 A1 * | 12/2006 | Cutler .......................... 700/83 |
| 2007/0050053 A1 * | 3/2007 | Cutler .......................... 700/34 |
| 2007/0078529 A1 * | 4/2007 | Thiele et al. .................. 700/29 |
| 2008/0065241 A1 | 3/2008 | Boe et al. |
| 2008/0065242 A1 | 3/2008 | Attarwala |
| 2008/0077257 A1 * | 3/2008 | Peterson et al. ............... 700/34 |

OTHER PUBLICATIONS

Goodhart S.G., Advanced Process Control Using DMCplus, UKACC International Conference on Control, 98, Sep. 1-4, 1998, Conference Publication No. 455.*
Linear Algebra Basics, www.unm.edu/~toolson/mathbio/lin_alg_bkgrnd.doc, 2009.*
Chen et al., On the Rounding Rules for Logarithmic and Exponential Operations, Chinese Journal of Physics, 2005.*
PPI Guide to Significant Digits and Rounding Numbers, Professional Publications, 2003.*
Jessica C., Log of a Negative Number, Ask a Scientist, 2003.*
MathCad 8 User's Guide, Mathsoft, Inc., 1998, p. 175.*

\* cited by examiner

*Primary Examiner*—Albert DeCady
*Assistant Examiner*—Darrin Dunn

(57) ABSTRACT

A method is presented for adjusting the steady-state gains of a multivariable predictive control, planning or optimization model with uncertainty. The user selects a desired matrix relative gain criteria for the predictive model or sub-model. This is used to calculate a base number. Model gains are extracted from the predictive model and the magnitudes are modified to be rounded number powers of the calculated base number.

18 Claims, 1 Drawing Sheet

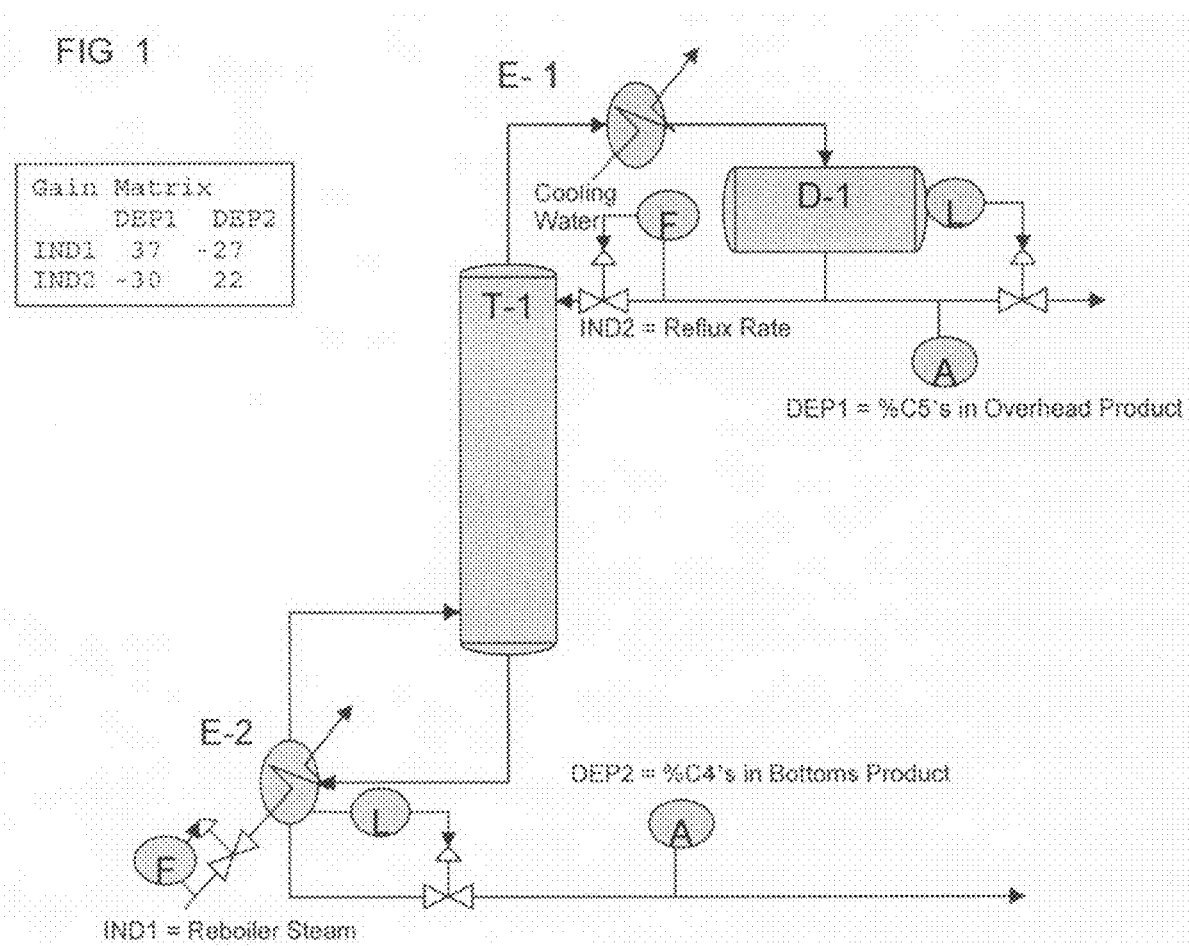

METHOD FOR MODEL GAIN MATRIX MODIFICATION

This application claims the benefit of U.S. Provisional application 60/839,688 filed Aug. 24, 2006.

BACKGROUND OF THE INVENTION

The present invention relates to a method for modifying model gain matrices. In particular, the present invention relates to model predictive process control applications, such as Dynamic Matrix Control (DMC or DMCplus) from Aspen Technology (See e.g. U.S. Pat. No 4,349,869) or RMPCT from Honeywell (See e.g. U.S. Pat. No. 5,351,184). It could also be used in any application that involves using a Linear Program to solve a problem that includes uncertainty (for example, planning and scheduling programs such as Aspen PIMS™).

Multivariable models are used to predict the relationship between independent variables and dependent variables. For multivariable controller models, the independent variables are manipulated variables that are moved by the controller, and the controlled variables are potential constraints in the process. For multivariable controllers, the models include dynamic and steady-state relationships.

Most multivariable controllers have some kind of steady-state economic optimization imbedded in the software, using economic criteria along with the steady-state information from the model (model gains). This is a similar problem to planning and scheduling programs, such as Aspen PIMS, that use a linear program (LP) to optimize a process model matrix of gains between independent and dependent variables.

For process models, there is almost always some amount of uncertainty in the magnitude of the individual model relationships. When combined into a multivariable model, small modeling errors can result in large differences in the control/optimization solution. Skogestad, et al., describes the Bristol Relative Gain Array (RGA) to judge the sensitivity of a controller to model uncertainty. The RGA is a matrix of interaction measures for all possible single-input single-output pairings between the variables considered. He states that large RGA elements (larger than 5 or 10) "indicate that the plant is fundamentally difficult to control due to strong interactions and sensitivity to uncertainty." For a given square model matrix G, the RGA is a matrix defined by $$RGA(G) = G \times (G^{-1})^T$$

where x denotes element by element multiplication (Schur product). In the general case, the model G can be dynamic transfer functions. For the purposes of explaining this invention we only consider the steady-state behavior of the controller, and the model G is only a matrix of model gains, but the invention not intended to be so limited.

Two main approaches for dealing with these sensitivity problems (indicated by large RGA elements) are possible. One approach is to explicitly account for model uncertainty in the optimization step (See e.g. U.S. Pat. No. 6,381,505). Another approach is to make small changes to the model, ideally within the range of uncertainty, to improve the RGA elements. The present invention is a process for implementing the second approach.

Current manual methods for model gain manipulation present some difficulties. Typically the user will focus on individual 2×2 "problem" sub-matrices within the overall larger matrix that have RGA elements above a target threshold. The user can change the gains in a given "problem" sub-matrix to either force collinearity (make the sub-matrix singular) or spread the gains to make the sub-matrix less singular. Applying this process sequentially to all problem sub-matrices is very time-consuming due to the iterative nature of the work process. Depending on the density of the overall matrix, changing one gain in the matrix may affect many 2×2 sub-matrices. In other words, improving (decreasing) the RGA elements for one 2×2 sub-matrix may cause RGA elements in another 2×2 sub-matrix to become worse (increase). Often after one round of repairing problem sub-matrices, sub-matrices which had elements below the target threshold will now have RGA elements above the target value. Additional iterations of gain manipulation need to be done without reversing the fixes from the previous iterations. This often forces the user to make larger magnitude gain changes than desired or necessary.

It is also possible to automate the manual process described above. A computer algorithm can be written to automate the manual method using a combination of available and custom software. Typically, such a computer program will adjust the gains based on certain criteria to balance the need for accuracy relative to the input model and the extent of improvement in the RGA properties required. Optimization techniques can be employed to achieve this balance. These algorithms are iterative in nature, and can require extensive computing time to arrive at an acceptable solution. They may also be unable to find a solution which satisfies all criteria.

In practice, the modification of a matrix to improve its RGA properties is often neglected, resulting in relatively unstable behavior in the optimization solution, particularly if a model is being used to optimize a real process and model error is present.

SUMMARY OF THE INVENTION

The current invention is a technique for modifying model gain matrices. Specifically, the technique improves 2×2 sub-matrix Relative Gain Array elements that make up a larger model matrix. The technique involves taking the logarithm of the magnitude of each gain in a 2×2 sub-matrix, rounding it, and then reversing the logarithm to obtain a modified sub-matrix with better RGA properties. The base of the logarithm is adjusted to balance the relative importance of accuracy versus improvement in the RGA properties. As the base of the logarithm is increased, the RGA properties of the sub-matrix are improved but the magnitude of possible change is increased. The entire matrix, or the selected sub-matrix, is modified using the same (or related) logarithm base. This invention may be used for multivariable predictive control applications, such as multivariable predictive control applications selected from the group of DMCplus and RMPCT, among others. The multivariable predictive control may be applied to control manufacturing processes, such as those found in a petroleum refinery, a chemical plant, a power generation plant, including nuclear, gas or coal based, a paper manufacturing plant. Examples of petroleum refinery process units include at least one selected from the group of crude distillation unit, vaccuum distillation unit, naphtha reformer, naphtha hydrotreater, gasoline hydrotreater, kerosene hydrotreater, diesel hydrotreater, gas oil hydrotreater, hydrocracker, delayed coker, Fluid Coker, Flexicoker, steam reformer, sulfur plant, sour water stripper, boiler, water treatment plant and combinations of the above. Additionally, this invention may be used in conjunction with LP models, such as PIMS.

This invention greatly simplifies the process of modifying a model matrix to improve RGA properties. In general, all elements in the entire matrix are modified on the first iteration, and the resulting matrix is guaranteed to have no single 2×2 sub-matrix RGA element larger than the desired threshold. The invention is ideally suited for implementation via a computer algorithm, and therefore the time required to modify each sub-matrix and the overall matrix can be greatly reduced once the algorithm is generated.

The present invention includes the following:

1. The application of a logarithmic rounding technique to modify individual values in a matrix.

2. The technique for calculating the logarithm base to be used in the rounding process given the desired maximum RGA elements for any 2×2 sub-matrix in the final matrix.

3. The technique for calculating the logarithm base to be used in the rounding process given the desired maximum percentage change allowed for any value in each sub-matrix or in the overall matrix.

4. The technique for restoring collinear 2×2 sub-matrices that have been made non-collinear by the logarithmic rounding process.

5. The technique for forcing 2×2 sub-matrices in the final matrix to be either exactly collinear or non-collinear. These and other features are discussed below.

BRIEF DESCRIPTION OF THE DRAWING

FIG. 1 is a flow diagram illustrating a simple distillation unit having two independent variables and two controlled variables.

DETAILED DESCRIPTION OF THE PREFERRED EMBODIMENTS

A detailed description is demonstrated by an example problem. Consider a predictive model with 2 independent variables and 2 dependent variables. The gain matrix represents the interaction between both independent variables and both dependent variables. Table 1 shows an example of a 2×2 model prediction matrix.

A simple light ends distillation tower can be used as a process example for this problem. In this case, as shown in FIG. 1, IND1 is the reboiler steam input, IND2 is the reflux rate, DEP1 is the C5+(pentane and heavier) concentration in the overhead product stream, and DEP2 is the C4−(butane and lighter) concentration in the bottoms product stream. In this example problem, the relative effects on the two product qualities are very similar, from a gain ratio perspective, regardless of which independent variable is manipulated. When reboiler steam is increased, the C5's in the overhead increase, and the C4's in the bottoms product decrease. When the reflux rate is increased, the C5's in the overhead product decrease, but the C4's in the bottoms product increase. The two independent variables have similar, but opposite, effects on the two dependent variables.

The gain matrix represents the interaction between both independent variables and both dependent variables.

TABLE 1

|  | DEP1 (% C5+ Ovhd) | DEP2 (% C4− Btms) |
|---|---|---|
| IND1 (Reboiler Steam) | 37 | −27 |
| IND2 (Reflux Rate) | −30 | 22 |

The formula for Relative Gain Array is:

$$RGA(G) = G \times (G^{-1})^T \quad (1)$$

If the RGA formula is applied to our example 2×2 problem, the result is the 2×2 array:

TABLE 2

| 203.5 | −202.5 |
|---|---|
| −202.5 | 203.5 |

These RGA elements have a very high magnitude, which is undesirable. If the maximum acceptable RGA element magnitude is chosen to be 18, for example, the following formula can be used to calculate the logarithm base that will be used to modify the matrix.

$$LOGBASE = \frac{1}{\left[1 - \frac{1}{MAX\_RGA}\right]} = \frac{1}{\left[1 - \frac{1}{18}\right]} = 1.0588235 \quad (2)$$

For each gain in the original matrix, the logarithm of the absolute value of the number with the base chosen from above (1.0588235 . . . ) is calculated, resulting in the matrix given in Table 3.

TABLE 3

|  | DEP1 | DEP2 |
|---|---|---|
| IND1 | 63.17386488 | 57.66144728 |
| IND2 | 59.50475447 | 54.07852048 |

In the preferred embodiment, each of these numbers is rounded to the nearest integer. The formula provided in equation 2 applies to the case where the rounding desired is to the nearest whole number (integer). In the event that rounding is desired to the nearest single decimal ($\frac{1}{10}$), then multiply the LOGBASE calculated in equation 2 by 10. In the event that rounding is desired to the nearest two decimals ($\frac{1}{100}$), then multiply the LOGBASE calculated in equation 2 by 100. This method is applicable to any degree of decimal precision by simply mutiplying the LOGBASE calculated in equation 2 by the 10 raised to the power corresponding to the number of decimals desired. The resulting integer matrix is shown in Table 4.

TABLE 4

|  | DEP1 | DEP2 |
|---|---|---|
| IND1 | 63 | 58 |
| IND2 | 60 | 54 |

The gains are recalculated by taking the logarithm base from formula (2) to the integer powers shown in TABLE 4. Where the original gain was a negative number, the result is multiplied by −1. Applying these steps results in the modified gain matrix shown in Table 5.

TABLE 5

|  | DEP1 | DEP2 |
|---|---|---|
| IND1 | 36.63412093 | −27.52756876 |
| IND2 | −30.86135736 | 21.90148291 |

If the RGA formula is applied to this matrix, the highest RGA element magnitude is equal to our desired maximum value shown in Table 6.

TABLE 6

| | |
|---|---|
| −17 | 18 |
| 18 | −17 |

The matrix modification process was able to do this by making relatively small changes in the original gain matrix. On a relative basis, the amount of gain change in each of the individual responses is shown in Table 7 below. This amount of change is normally well within the range of model accuracy.

TABLE 7

| | DEP1 | DEP2 |
|---|---|---|
| IND1 | −0.99% | 1.95% |
| IND2 | 2.87% | −0.45% |

In an alternative embodiment, the base logarithm number can be chosen based on the maximum desired gain change, in units of percentage, using the formula (3) below. For the example problem used above, a maximum gain change of approximately 2.9% results in the same logarithm base as chosen above.

$$LOGBASE = \left[\frac{MAX\_CHNG}{100} + 1\right]^2 \quad (3)$$

In another alternative embodiment, the logged gains can be rounded to any fixed number of decimals for all matrix elements being operated on. For ease of use, it makes sense to choose a base logarithm where the desired results can be obtained from rounding the logged gains to an integer value. However equivalent results are obtained by rounding to any number of decimals if the base logarithm is adjusted. For example, if the base logarithm in the above example is chosen to be a power of ten greater than before, $$LOGBASE = 1.0588235^{10} = 1.77107 \quad (4)$$

an equivalent result will come from rounding the logarithms of the gains to the nearest tenth.

In another alternative embodiment, the rounded numbers can be chosen to enforce a desired collinearity condition. If the difference between the rounded logarithms of the gains for two independent variables is the same for two different dependent variables, then that 2×2 sub-matrix is collinear. In other words, it is has a rank of one instead of two. The direction of rounding can be chosen to either enforce collinearity, or enforce non-collinearity. If the direction of rounding the logarithms of the gains from Table 3 is chosen to enforce collinearity, the integers could be chosen as shown in Table 8.

TABLE 8

| | DEP1 | DEP2 |
|---|---|---|
| IND1 | 63 | 58 |
| IND2 | 59 | 54 |

The resulting matrix obtained by recalculating the gains is of rank 1 as shown in Table 9.

TABLE 9

| | DEP1 | DEP2 |
|---|---|---|
| IND1 | 36.63412093 | −27.52756876 |
| IND2 | −30.86135736 | 21.90148291 |

Included in the preferred embodiment is the application of the same algorithm to any gain multiplication factor used inside the predictive model. Often gain multiplication factors are used to modify the model in response to changing conditions. Choosing the gain multiplication factor to be a rounded power of the same base as the model, will guarantee that the gain multiplied model has the same overall RGA characteristics.

Included in the preferred embodiment is the application of the same algorithm to building block models that are used to construct the final predictive model. Often the final model is the result of some combination of building block models that do not exist in the final application. By applying this same process to these building block models, the final model will have the same RGA characteristics.

The above description and drawings are only illustrative of preferred embodiments of the present inventions, and are not intended to limit the present inventions thereto. Any subject matter or modification thereof which comes within the spirit and scope of the following claims is to be considered part of the present inventions.

References Cited

U.S. Patent Documents

| 4,349,869 | September 1982 | Prett, et al. |
| 5,351,184 | September 1994 | Lu, et al. |
| 6,381,505 | April 2002 | Kassman, et al. |

Other References

Skogestad, et al.-"Multivariable Feedback Control: Analysis and Design", Second Edition. John Wiley & Sons, 2005

What is claimed is:

1. A method to modify a model gain matrix for a model for a multivariable predictive control application implemented by a controller having at least one independent-dependent variable pair comprising:

(a) choosing a logarithm base, (b) reading a model gain for an independent-dependent variable pair in the model gain matrix for a model for a multivariable predictive control application implemented by a controller, (c) taking an absolute value of the model gain, (d) taking a logarithm of the absolute value of the model gain of step (c) with the logarithm base chosen in step (a), (e) rounding the logarithm from step (d) to a fixed number of decimals to form a rounded logarithm of fixed number of decimals, (f) taking an anti-logarithm of the rounded logarithm from step (e) by taking the logarithm base from step (a) raised to a power of the rounded logarithm of fixed number of decimals from step (e), (g) multiplying the anti-logarithm of step (f) by −1 if the model gain was originally a negative number to determine a calculated gain, (h) using this calculated gain in a modified model gain matrix to modify the model gain matrix on said controller that implements the multivariable predictive control application, (i) repeating this method for other model gains in the same model, using the same logarithm base chosen in step (a) and the same fixed number of decimals in step (e).

2. The method of claim 1 wherein step (a) is performed by choosing a maximum allowable Relative Gain Array element (MAX_RGA) determined by;

$$LOGBASE = \frac{1}{\left[1 - \frac{1}{MAX\_RGA}\right]}.$$

3. The method of claim 1 wherein step (a) is performed by choosing a maximum allowable percentage gain change (MAX_CHNG) determined by;

$$LOGBASE = \left[\frac{MAX\_CHNG}{100} + 1\right]^2.$$

4. The method of claim 1 wherein the rounding performed in step (d) is chosen to force collinearity in 2×2 sub-matrices made up from two independent variable-dependent variable pairs.

5. The method of claim 1 wherein the rounding performed in step (d) is chosen to force non-collinearity in 2×2 sub-matrices made up from two independent variable-dependent variable pairs.

6. The method of claim 1 further applied to internal gain multiplication factors used to modify the model gains.

7. The method of claim 1 further applied to building block models, which are used to construct a final model but do not exist in the final model.

8. The method of claim 1 where the multivariable predictive control application is DMCplus or RMPCT.

9. The method of claim 1 in which the model gain matrix is used as an input to a linear program.

10. The method of claim 1 applied as a pre-processing step to multivariable predictive control calculations.

11. The method of claim 1 applied as a pre-processing step to planning and scheduling calculations.

12. The method of claim 1 where the rounding in step (d) is to zero decimals.

13. The method of claim 1 where the multivariable predictive control application is applied to control a manufacturing process.

14. The method of claim 13, where the manufacturing process is a petroleum refinery process: refinery distillation unit, chemical plant distillation unit, crude distillation unit, vacuum distillation unit, naphtha reformer, naphtha hydrotreater, gasoline hydrotreater, kerosene hydrotreater, diesel hydrotreater, gas oil hydrotreater, hydrocracker, delayed coker, Fluid Coker, Flexicoker, steam reformer, sulfur plant, sour water stripper, boiler, water treatment plant and combinations of the above.

15. The method of claim 2 where the rounding in step (d) is to one decimal and where LOGBASE is multiplied by 10.

16. The method of claim 2 where the rounding in step (d) is to two decimals and where LOGBASE is multiplied by 100.

17. The method of claim 3 where the rounding in step (d) is to one decimal and where LOGBASE is multiplied by 10.

18. The method of claim 3 where the rounding in step (d) is to two decimals and where LOGBASE is multiplied by 100.

* * * * *